Figure 4:
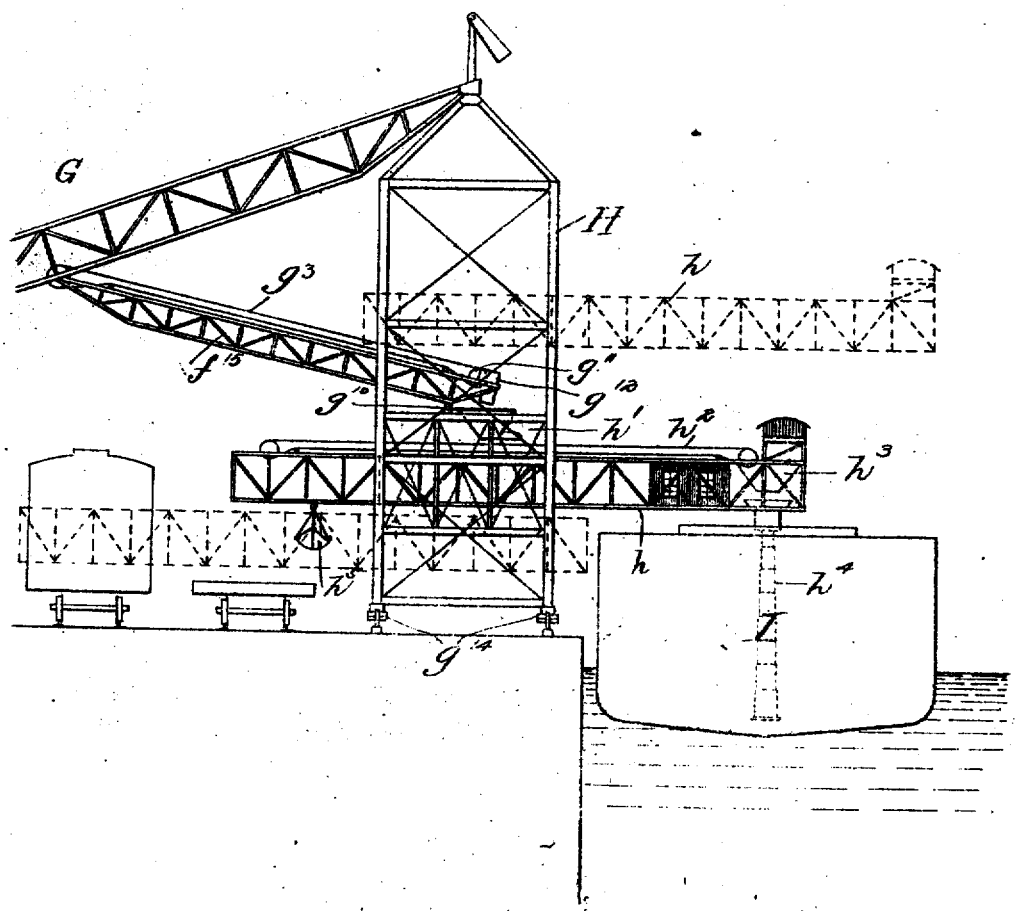

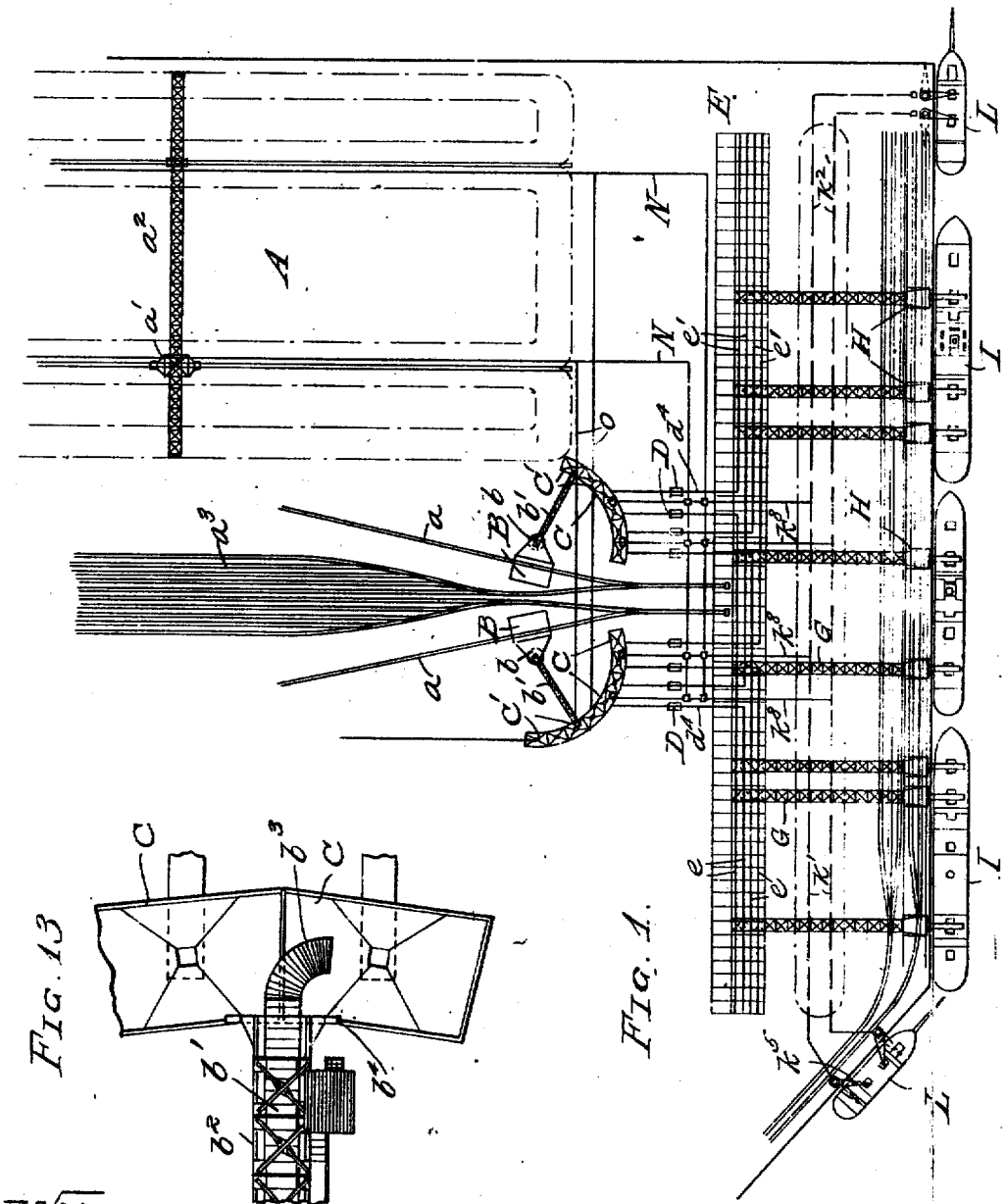

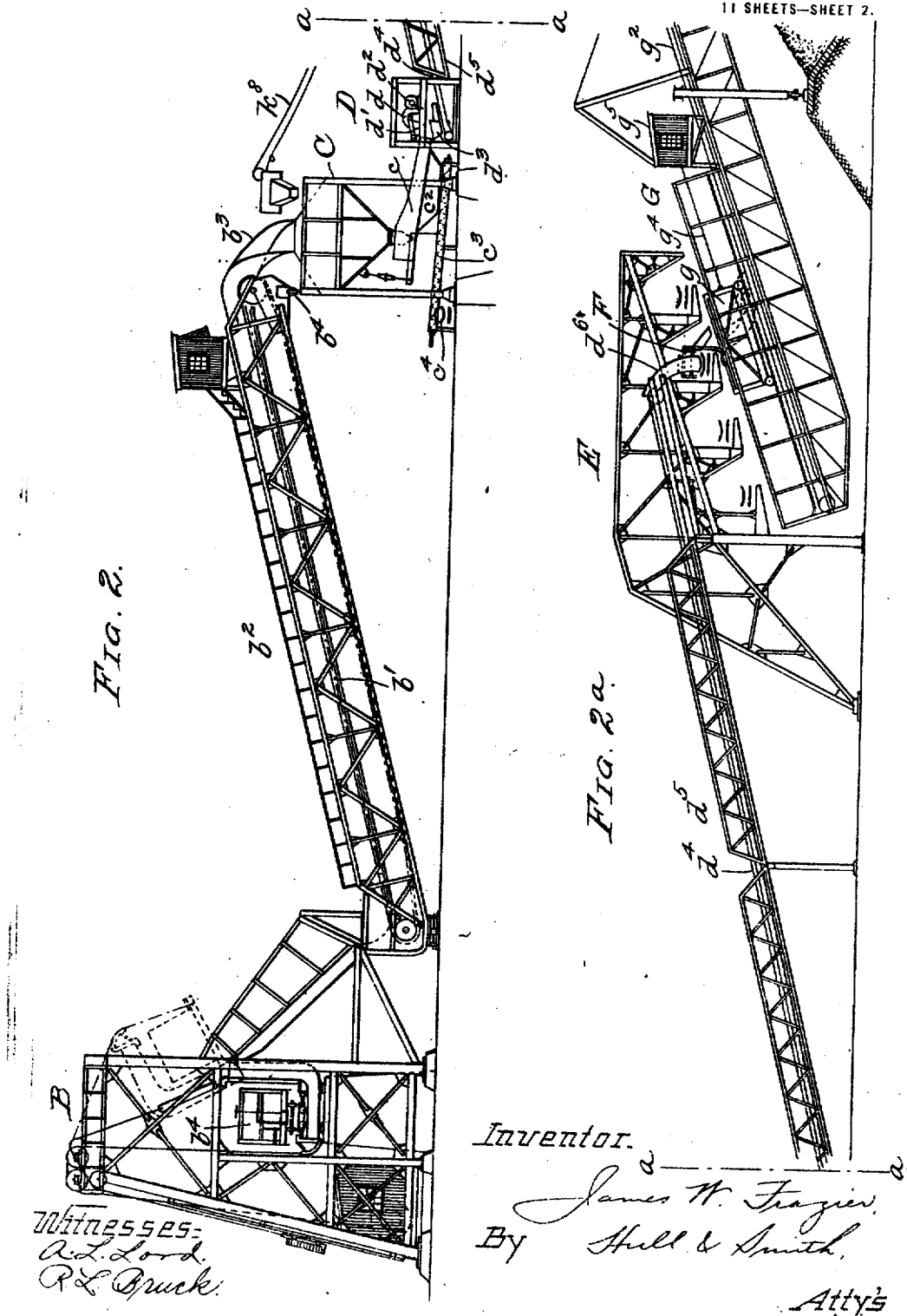

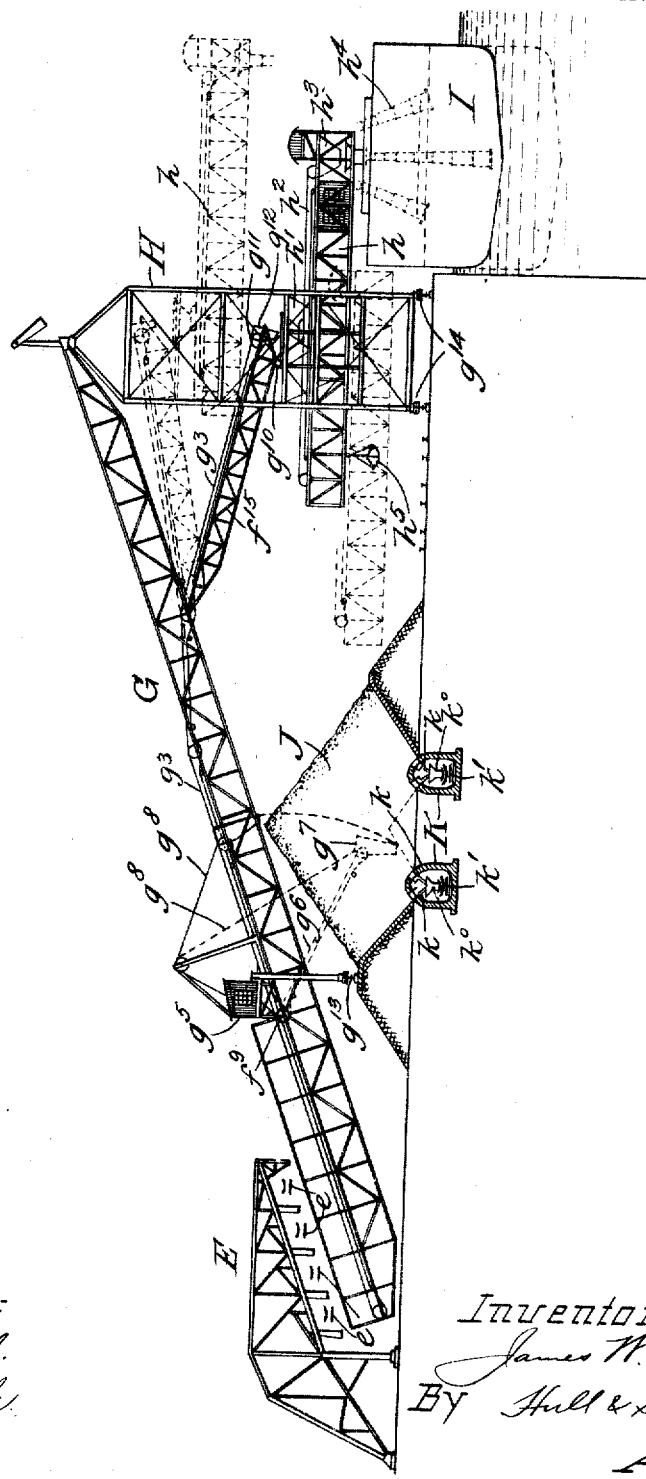

J. W. FRAZIER.
COALING SYSTEM.
APPLICATION FILED MAY 20, 1913.
1,321,025.
Patented Nov. 4, 1919.
11 SHEETS—SHEET 4.
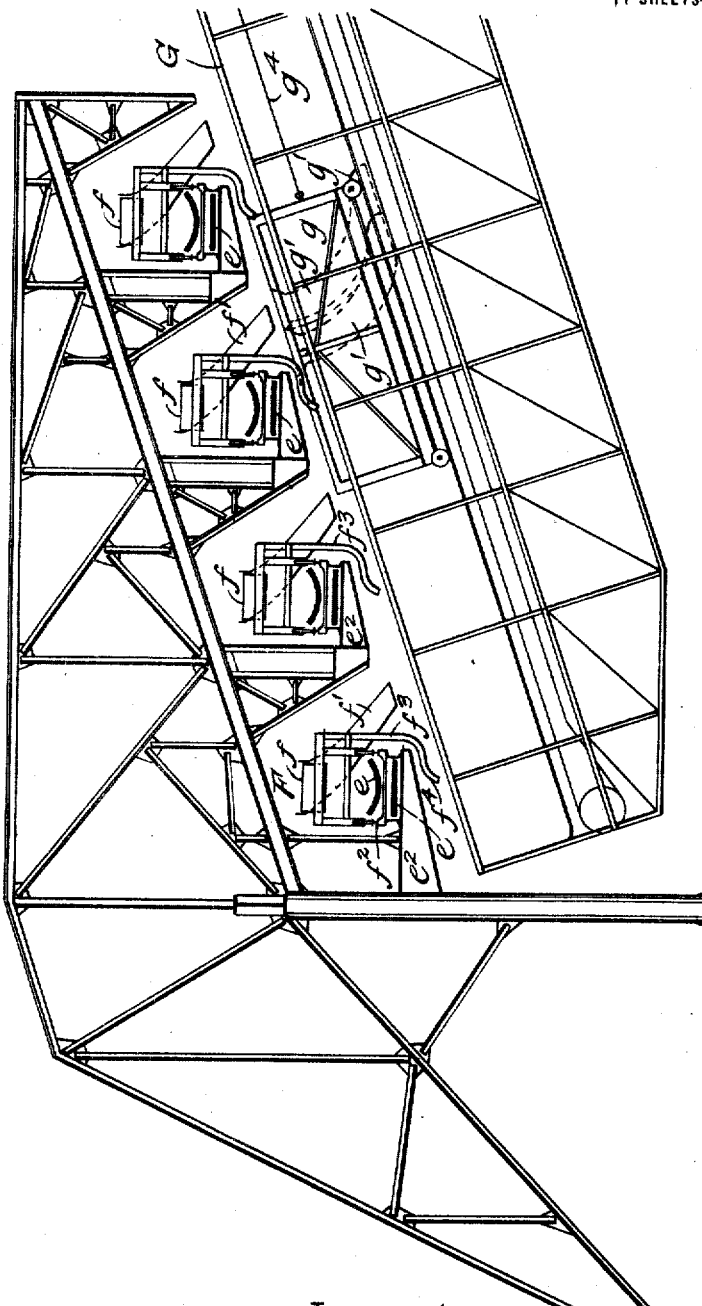
Witnesses:
A. L. Lord
R. L. Bruck
Inventor.
James W. Frazier
By Hull & Smith,
Atty's.

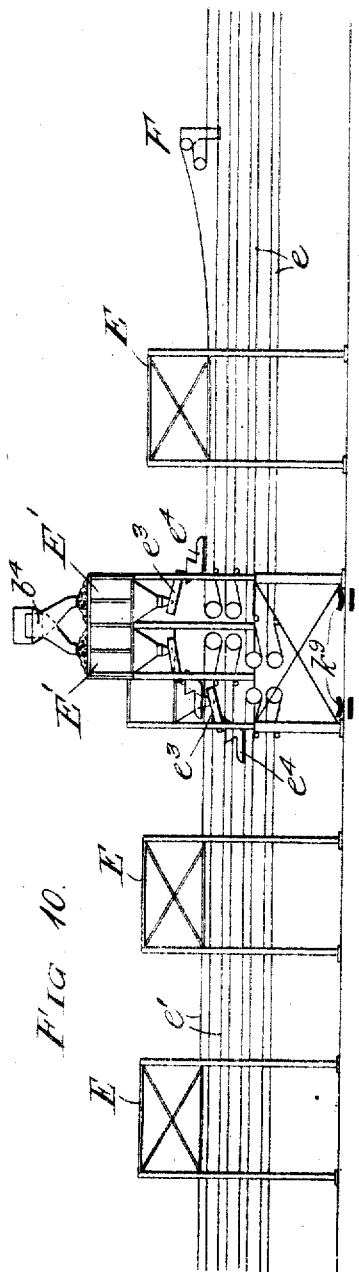
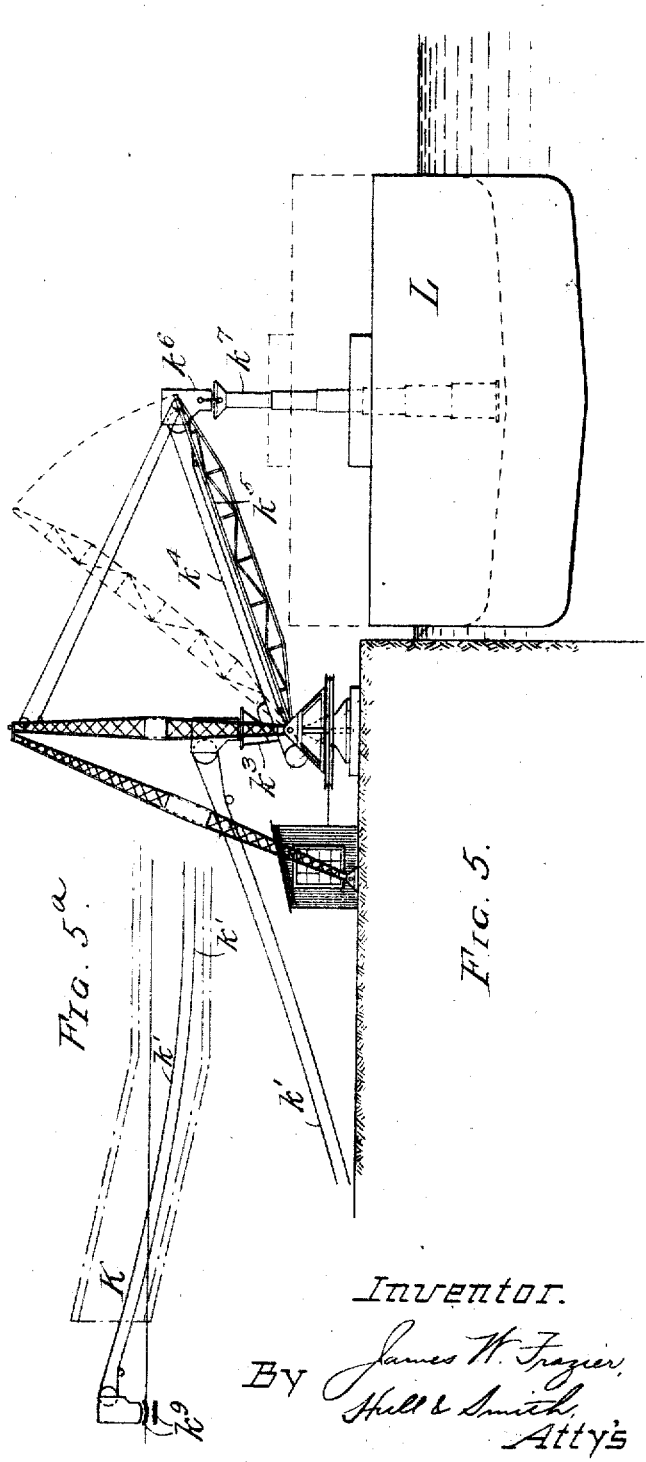

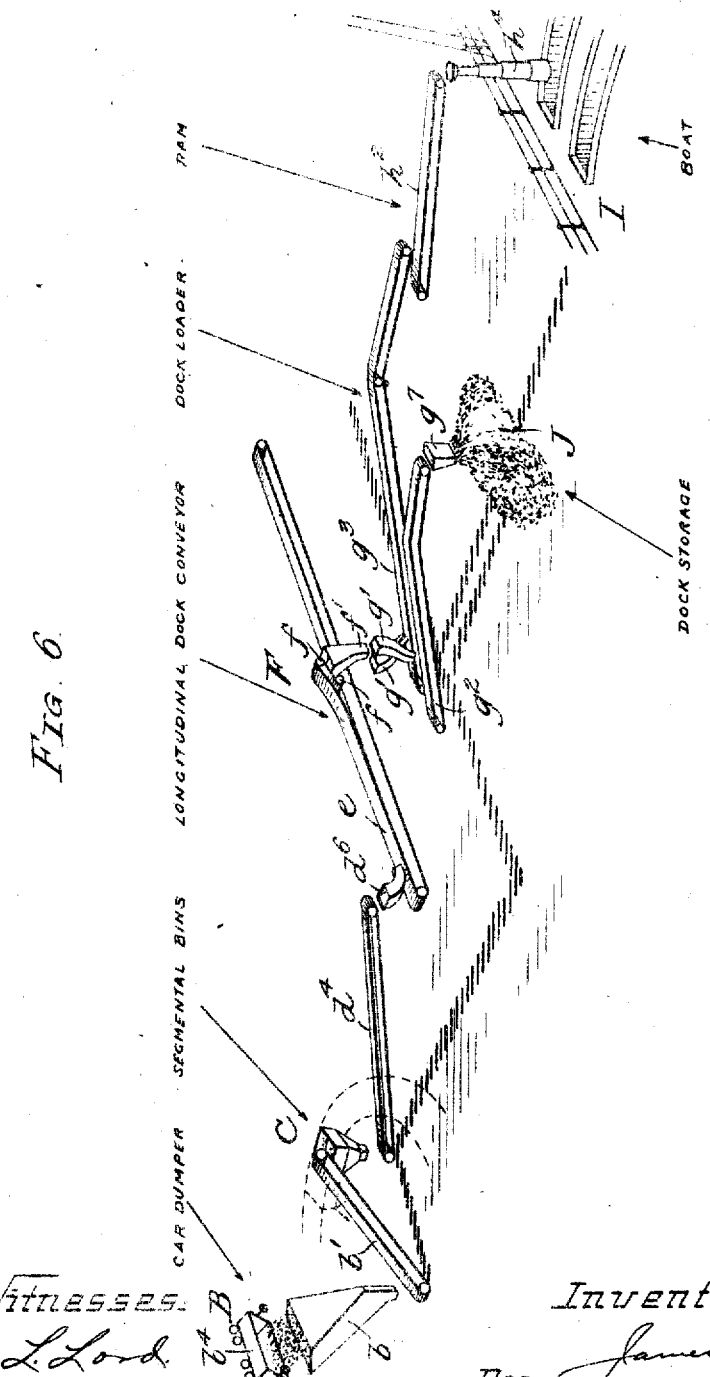

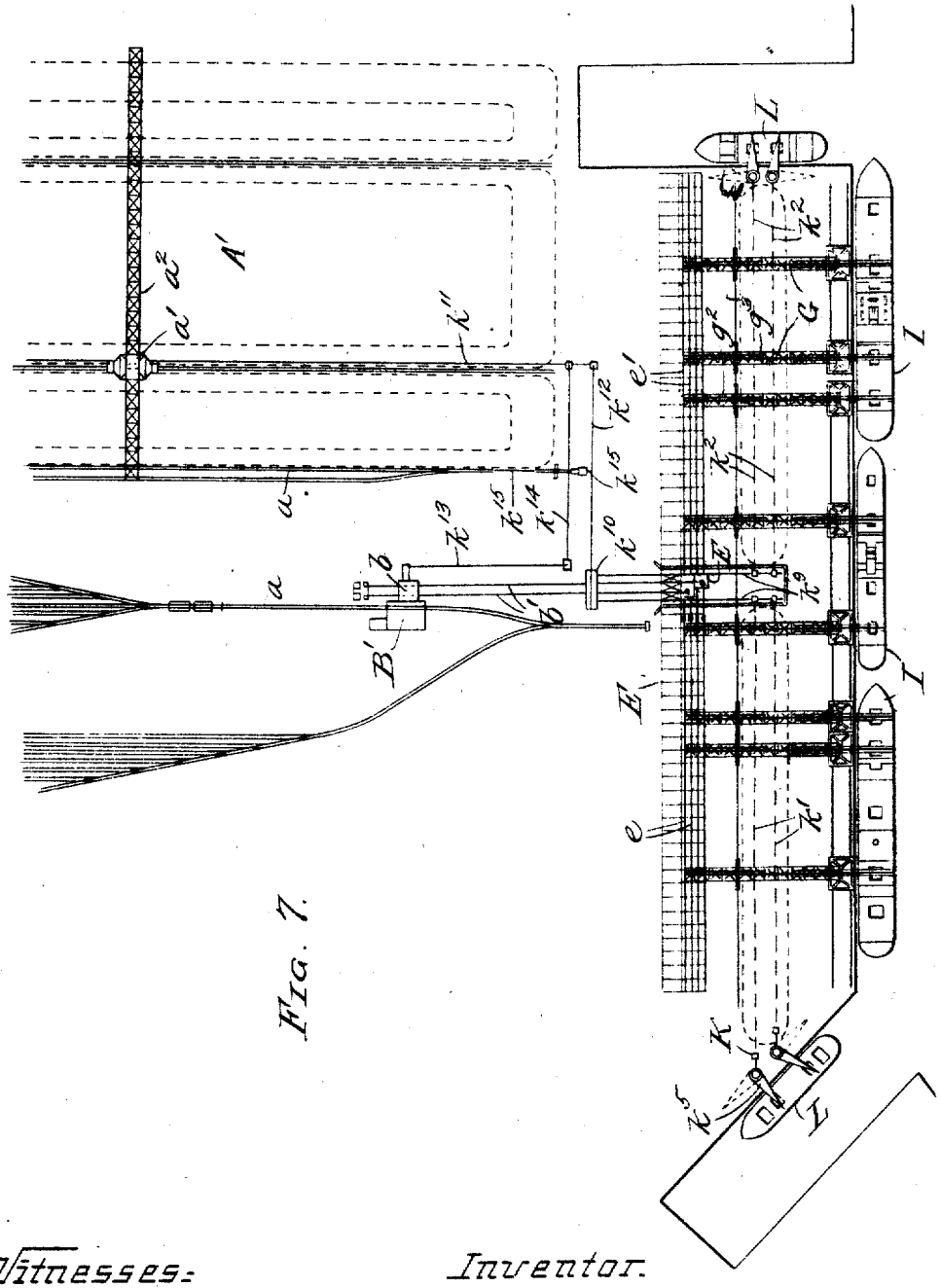

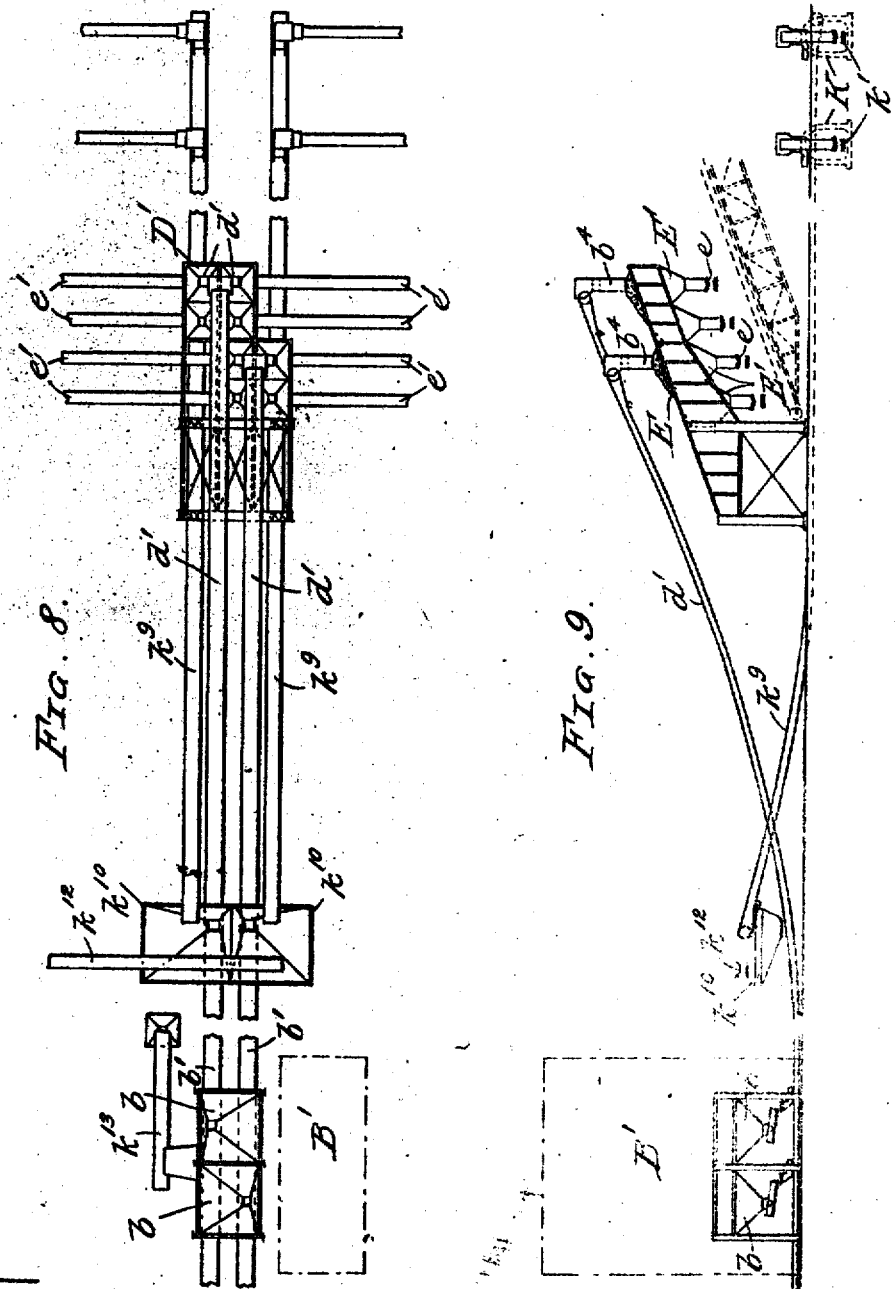

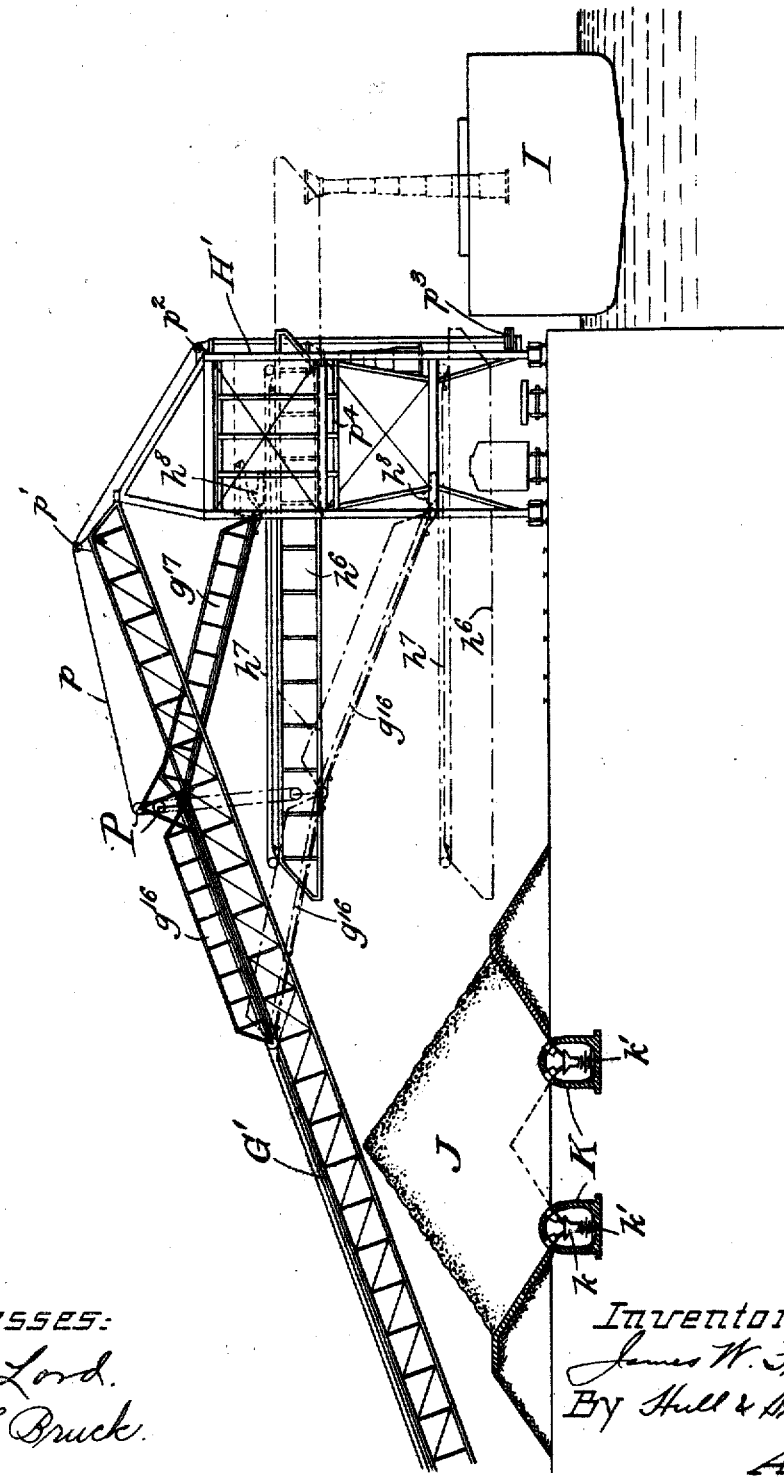

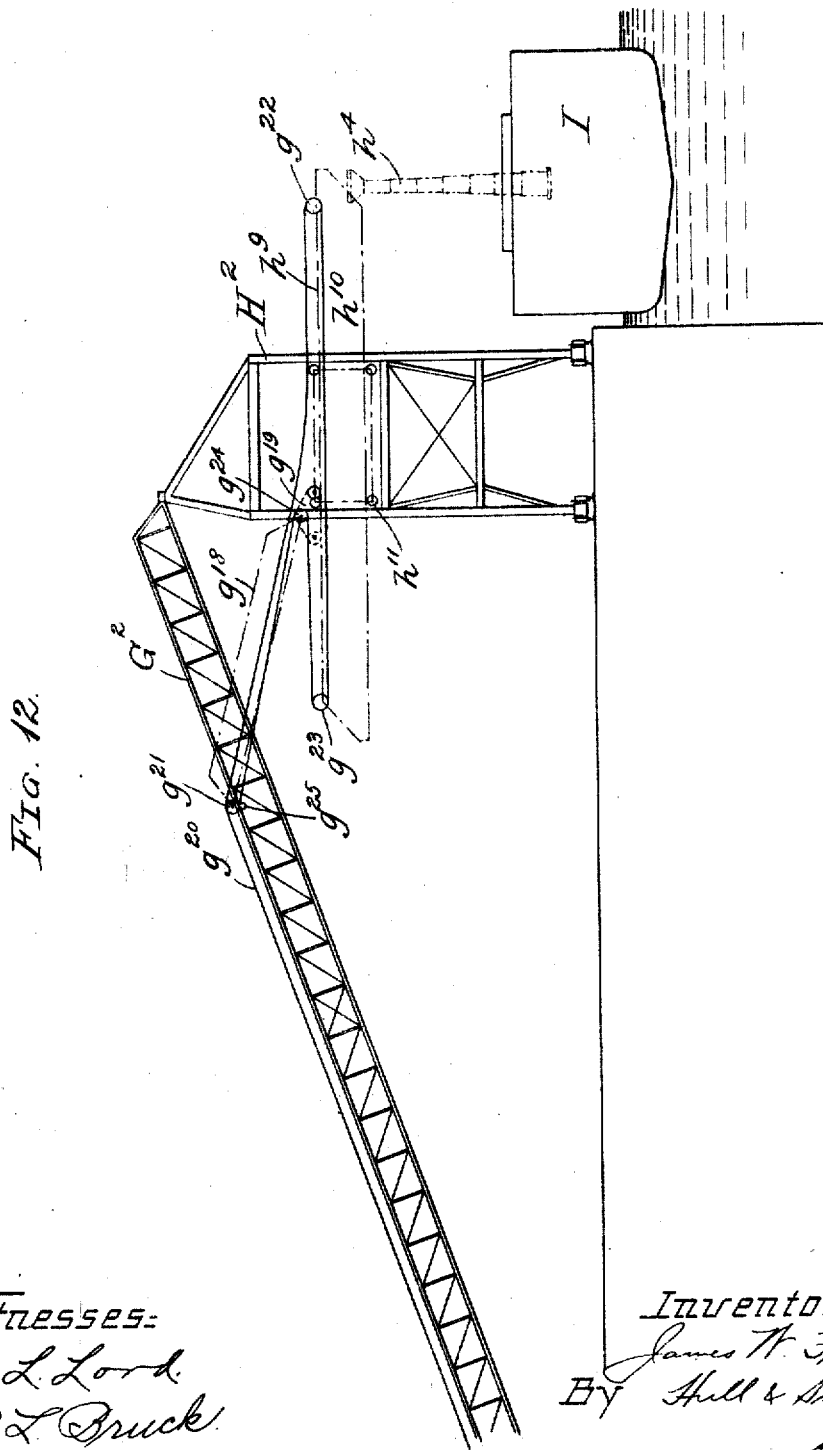

UNITED STATES PATENT OFFICE.

JAMES W. FRAZIER, OF CLEVELAND, OHIO.

COALING SYSTEM.

1,321,025.　　　　Specification of Letters Patent.　　Patented Nov. 4, 1919.

Application filed May 20, 1913. Serial No. 768,830.

*To all whom it may concern:*

Be it known that I, JAMES W. FRAZIER, a citizen of the United States, residing at Cleveland, in the county of Cuyahoga and State of Ohio, have invented a certain new and useful Improvement in Coaling Systems, of which the following is a full, clear, and exact description, reference being had to the accompanying drawings.

This invention relates to loading, unloading and distributing apparatus and systems, and has for its general object to provide a system or apparatus of this kind which will be of great capacity and flexibility; which will enable the material to be handled and distributed quickly, conveniently, and in such manner as to adapt the system or apparatus to all of the ordinary incidents of use; to provide a construction and arrangement whereby the breakage of the material is reduced to a minimum; to enable vehicles, such as vessels, to be loaded by means of movable machinery and without the necessity for moving the vehicles; and, generally, to provide a construction and arrangement of parts whereby the distribution, loading, unloading and storage of material may be accomplished on a very large scale and with a minimum equipment and a corresponding reduction in outlay for installation. Further and more limited objects of the invention will appear in the detailed description of the same which follows and will be pointed out in the claims hereto annexed.

In the drawings forming part hereof, Figure 1 represents a plan view of a loading, unloading, and distributing plant made, in accordance with my invention; Figs. 2, 2ª, and 2ᵇ are fragmentary side elevations of the plant, the three views conjointly showing a complete side elevation of the plant from the car dumping part thereof to the vessel loading part; Fig. 3 an enlarged side elevation of the lower end of one of the dock loading bridges and the overhanging cantaliver frame; Fig. 4 an enlarged detail in elevation of the vessel loading end of the plant or system; Fig. 5 a side elevation of one end of the auxiliary vessel loading apparatus; Fig. 5ª a diagrammatic elevation of the opposite end of the same; Fig. 6 a perspective diagrammatic representation of the plant or apparatus from the car dumping station to and including the main vessel loading station; Fig. 7 a plan view of a modified form of the loading, unloading and distributing plant shown in the preceding views; Fig. 8 a somewhat diagrammatic plan view of that part of the plant extending from the car dumper to the transverse conveyers and the dock storage conveyers; Fig. 9 a side elevation of the same portion of the plant or apparatus; Fig. 10 a somewhat diagrammatic front elevation of the longitudinal conveyers and the bins whereby the material conducted to the longitudinal frame work is distributed onto said longitudinal conveyers; Fig. 11 a side elevation of a modified form of bridge, tower, and ram; Fig. 12 a side elevation of a further modified form of the bridge, tower, and ram; and Fig. 13 a detail in plan illustrating the manner in which the material is distributed into the segmental bins to avoid breakage thereof.

The apparatus or system as illustrated herein, while capable of more general application, has special reference to the handling of coal or other frangible materia., as it accomplishes this object with a minimum of breakage. It will be understood, however, that my apparatus and system are not limited in operation to the handling of this particular material. The said apparatus or system, as shown herein, comprises generally a large storage plant, near a dock, with elevated tracks wherefrom coal (or other material) may be dumped and distributed from the cars to the storage plant and from which plant this material, should occasion require, may be conveyed to the dock-loading and unloading system for distribution to vessels, etc., at the dock. In addition to the storage plant, there are provided, in the preferred embodiment of my invention, one or more elevated tracks which lead to one or more car dumpers whereby the cars on said track or tracks may be dumped, the car dumpers being each provided with a chute from which the coal may be distributed by means of a pivotally supported conveyer into a segmental series of bins. Two such car dumpers, two such pivotally supported conveyers, and two such series of bins are shown. A certain number of bins in each segmental series will be employed in connection with conveyers leading to a dock storage pile and to vessels at the dock, but other bins may be arranged to discharge onto conveyers which lead to the main storage plant first referred to. The provision of the segmental series of bins allows a storage and distribution of coal in accordance with the variations in the grades thereof.

A suitable frame work of cantaliver construction, extending parallel with the front of the dock, supports two sets of conveyer belts running parallel to the front of the dock and in opposite directions and overhangs the lower ends of a series of dock loading bridges, each bridge being provided with a conveyer belt arranged to discharge its load into a vessel and with another conveyer belt arranged to discharge its load onto a dock storage pile, there being a belt tripper associated with the said frame and with the lower end of each bridge in such manner as to cause the longitudinal conveyer belt corresponding thereto to discharge its load into a distributer carried by the bridge, and each distributer in turn is adapted to discharge its contents onto either or both of the conveyer belts carried by its bridge. Each bridge is mounted on rails, whereby it may be moved along the dock, and carries at its elevated end a pivoted support for a conveyer belt, which is adapted to discharge upon a conveyer belt longitudinally and vertically adjustable by means of a ram mounted in the tower which supports the upper end of the bridge and which ram is provided at its discharge end with a chute distributing the contents of the last-mentioned belt or conveyer into the final storage space, the storage space being shown herein as the hold of a vessel. The last mentioned conveyer belt is preferably carried on the ram referred to above, and unloading means may also be carried by this ram.

A storage pile extends substantially the length of and beneath the dock, between the longitudinal conveyers and the front of the dock, and beneath this dock storage pile there are arranged two tunnels, each having therein a conveyer belt. These conveyer belts are adapted to discharge coal from the dock storage pile onto vessel loading devices at the ends of the dock; by reversing the conveyer belts, the coal may be carried to and distributed upon the conveyer belts which load the vessels at the front of the dock.

As the invention herein consists largely in the combination of structures which, separately considered, are old, the system is illustrated more or less diagrammatically. Detailed illustration and description are resorted to only in connection with those constructions which may not be sufficiently well known to those skilled in this art to enable them to understand the same without such particularity of disclosure.

Describing the invention by reference to the accompanying drawings, and particularly with reference to Figs. 1 to 6 hereof, A denotes the large storage plant to which attention has been directed heretofore. This plant may be supplied from cars utilizing the elevated tracks $a$ and discharging into the appropriate bins of the segmental series, whence the material is carried to the said storage plant by conveyers. The coal in this plant may be distributed by any suitable loading and unloading mechanism, carried by the trolley $a'$ on a transverse track $a^2$ extending over the bins or storage piles of the plant.

B denotes car dumpers of standard construction, to which the cars to be dumped are conducted along the inclined tracks $a$, the return tracks being indicated at $a^3$. Two such car dumpers are shown, and each car dumper is provided with a chute $b$, which chute is adapted to dump onto a conveyer $b'$ which is carried by a pivoted supporting frame $b^2$. The outer or swinging end of this frame is adapted to be brought above any one of a segmental series of bins C, a chute $b^3$ being provided at the discharge end of the conveyer to conduct the material into the appropriate bin. The upper and swinging end of the frame $b^2$ is conveniently supported by rollers $b^4$ on the inner edge of the bin series, such inner edge forming a track for the rollers. The chute $b^3$, as will appear more particularly from Fig. 13, is directed downwardly and laterally and the supporting frame $b^2$ will be so located that the contents of this chute are discharged against the inclined side of a bin, near the top of the bin, allowing the coal or other material to slide, without breaking, to the bottom of the bin. During the filling of each bin, the frame $b^2$ will be moved from time to time so that the chute will deposit the material in the bin in a series of layers, the coal sliding from the top of the bin upon the coal already deposited therein. As many of these bins will be employed as occasion may require. For the present, only those bins will be referred to which supply dock loading bridges. Four bins in each of the two segmental series are employed for this purpose in the installation illustrated herein, and these four bins are designated generally by the reference letter C. The bottom of each of these four bins is provided with a chute $c$ (see Fig. 2). This chute is suspended beneath the bin and has its discharge end $c'$ connected with shaking mechanism indicated generally at D and serving both to feed and screen the material therein. This mechanism comprises a wheel $d$ which is eccentrically connected by a link $d'$ with the discharge end of the chute $c$, the wheel being driven by suitable mechanism indicated at $d^2$. The screenings from the chute $c$ are guided by a chute $c^2$ to a helical conveyer $c^3$ and thence may be discharged onto a conveyer belt $c^4$ leading to any desired place. The chute $c$ discharges into a chute $d^3$ which in turn discharges onto the conveyer $d^4$, this conveyer being supported by suitable frame work $d^3$. This frame work is inclined upwardly and extends to and has its upper end supported by a frame E of cantaliver construction which extends substantially the full length of the dock.

The frame E overhangs the lower ends of the inclined dock loading bridges and supports the longitudinal conveyers which extend parallel with the front of the dock and which discharge their contents onto either of the two conveyers carried by each bridge. At the upper discharge end of each conveyer $d^4$ there is provided a chute $d^6$ which is located above a longitudinal dock conveyer. Two series $e$ and $e'$ of these dock conveyers are shown, one series extending from the central portion of the dock toward one end thereof and the other series extending from the central portion of the dock toward the opposite end thereof (see Fig. 1). Each of these conveyers is supported by a suitable bracket $e^2$ carried by the frame E and passes through a tripper, indicated generally at F and comprising tripping pulleys $f$ around which the upper or carrying section of the conveyer is adapted to pass and a chute $f'$ extending laterally and downwardly from the discharging portion of the conveyer and above a suitable distributing device (to be described hereinafter) on the dock loading bridge.

The trippers are mounted upon rails $f^2$ (see Fig. 3) carried by the cantaliver frame and are movable therealong to different positions, corresponding to the position of the coöperating dock loading bridge. The tripping mechanism F as described thus far is of well known construction and no claim is made in this application to the details thereof as described hereinbefore. Certain coöperating features between the tripping mechanism and the distributer on the loading and unloading device, however, are believed to be novel, as well as the relation of the tripping mechanism to the general assembly.

The chute $f'$, coöperates with a distributing car $g$ mounted on each dock loading bridge G. Each distributing car is provided with longitudinally spaced chutes $g'$, preferably having their receiving ends near the middle of the car, the lower ends of the chutes being laterally spaced whereby the material dumped by the tripper may be distributed onto either or both of the conveyers $g^2$, $g^3$ carried by the bridge (see Fig. 6). These distributing cars are raised and lowered along their respective bridges by means of a suitable cable $g^4$, which may be operated by means of a suitable drum (not shown) at the station $g^5$. The car may be so placed with reference to the tripper chute $f'$ as to distribute the material from this chute simultaneously into either or both of the chutes $g'$, and thence onto either or both of the transverse conveyers $g^2$, $g^3$ therebeneath. This distribution of the material into both of the chutes $g'$ is obtained by adjusting the car $g$ so as to bring the bottom of the chute $f'$ above the transverse partition between the mouths of the chutes $g'$. This will result in dividing the contents of the chute $f'$ between the two chutes $g'$. These conveyers are supported by the bridge G, and the first mentioned conveyer extends up this bridge a comparatively short distance, thence over pulleys carried by a pivoted carrier frame $g^6$ which carries at its outer end a dumping chute $g^7$ (see Fig. 2$^b$). The swinging end of this frame $g^6$ is operated by means of a suitable rope or cable $g^8$ extending over a pulley on the bridge and connected to a hoisting drum (not shown) at the station $g^5$. The position of the parts $g^6$, $g^7$, and $g^8$ when the frame is lowered are shown in dotted lines, Fig. 2$^b$.

The other conveyer $g^3$ passes over suitable guide pulleys or rollers to a carrier frame $g^9$ which is pivoted at one end to the bridge G and has its outer or free end supported by rollers $g^{10}$ on a vertically and longitudinally adjustable ram or frame $h$ in the tower H which supports the upper end of the bridge G. The outer or delivery end of the conveyer $g^3$ passes around a dumping pulley $g^{11}$ and discharges into a chute $g^{12}$ which in turn discharges into a hopper $h'$ above the conveyer $h^2$. The conveyer $h^2$ is carried by the vertically and longitudinally adjustable ram or frame $h$ and its outer or delivery end discharges into a swinging and telescoping chute $h^4$ whereby the material may be distributed within the hold of a vessel I or other suitable storage space. Each ram or frame $h$ may be provided with a loading and unloading device $h^5$, which is illustrated herein as a loading and unloading bucket adapted to traverse the ram or frame.

The bridges G are substantially identical in construction and the description of one will serve for all. Each bridge is longitudinally adjustable along the dock, being mounted on rails $g^{13}$, $g^{14}$, the rails $g^{14}$ supporting the upper end of the bridge through the tower H.

Reference has been made to the coöperating constructions of the belt trippers and the distributing cars. Each belt tripper is provided with a depending device which is adapted to engage the car and maintain the tripper in proper relation to the particular bridge so that the longitudinal conveyers $e$ or $e'$ may deliver its material to the conveyers $g^2$, $g^3$ on the bridge G. This device is shown herein as a yoke having downwardly extending forks $f^3$ each having its lower end curved downwardly and forwardly as shown at $f^4$. The lower ends of these forks extend in both sides of a car $g$ when the latter is lowered in place by its cable $g^4$ and serve to move the tripper F longitudinally along the cantaliver frame E as the bridge G is moved. By adjusting the cable $g^4$, the upper ends of either or both of the chutes $g'$ may be brought beneath the delivery end of the chute $f'$.

J denotes a dock storage pile, which is supplied by the belts or conveyers $g^2$. There may be two such piles and each pile has therebeneath a pair of tunnels K, each having chute therein discharging into a traveling feeder $k^0$. Conveyer belts $k'$ are provided beneath feeders $k^0$ and extend from the central portion of the dock to one end thereof. Similar conveyer belts $k^2$ are provided in the tunnel and extend from the central portion of the dock to the other end thereof. The belts or conveyers $k'$, $k^2$ are adapted to convey coal discharged through the feeders $k^0$ into a chute $k^3$ located above a conveyer $k^4$ mounted on a pivoted carrying arm $k^5$, the outer end of which is provided with a chute $k^6$ by which the coal or other material discharged on the conveyer $k^4$ may be in turn discharged into the swinging telescopic chute $k^7$ and thus into the hold of a vessel L at either end of the dock.

It will be seen that, by reversing the belts or conveyers $k'$, $k^2$ material may be conveyed to the conveyer belts $k^4$ and thence to chutes M above and discharging into the bins C. Conveyer belts N, from the main storage plant A, discharging at the points $m$, are adapted to supply the bins C through the conveyers $k^8$.

In addition to the bins which supply the longitudinal dock conveyers $e$, $e'$, each segmental series of bins comprises a plurality of bins $C'$. These bins are adapted to discharge onto conveyers O which conduct material from the bins to the large storage plant A. As outlined in Fig. 1, the conveyers N may be used in conjunction with the conveyers O for this purpose, being operated in the reverse direction for this purpose.

In Fig. 6 I have shown diagrammatically the distribution of the coal (or other material) from the car dumping station to the dock storage pile and to the vessels or other storage space additional to the dock pile. The reference character B represents the dumping station generally, showing a car $b^4$ dumping its contents in the chute $b$. The lower end of this chute is shown as discharging onto the conveyer $b'$ and the upper end of this conveyer into a bin C of the segmental series. Beneath the bin selected for illustration, there is shown the conveyer $d^4$ discharging into the chute $d^6$ above a longitudinal dock conveyer $e$. This conveyer is shown as passing over a tripper F comprising the tripping pulleys $f$ and the laterally directed chute $f'$. The lower end of this chute is shown as coöperating with the chutes $g'$ whereby the contents of the first mentioned chute may be discharged onto either or both of the conveyers $g^2$, $g^3$ of a dock loading bridge. The conveyer $g^2$ is shown as discharging, through its pivotally supported section, into the chute $g^7$ and thence onto the dock pile J. The conveyer $g^3$ is shown as discharging through its pivotally supported section upon the conveyer $h^2$ which in turn discharges into the adjustable chute $h^4$ shown as arranged to discharge into one of the holds of the vessel I.

It will be understood that suitable controlling stations will be provided for handling the apparatus illustrated and described herein. The arrangement of these stations and the control of the mechanism may be left to those skilled in the art.

In Fig. 7 there is shown a modification of the apparatus illustrated and described in Figs. 1 to 6 inclusive wherein the coal or other material that is discharged into the car dumper is conducted directly from the chutes or bins thereof to a series of dock storage bins which are carried by the cantaliver frame and which overhang the longitudinal dock conveyers. In this modification, provision is also made for conveying coal or other material to the dock storage piles from the large storage plant A'.

Referring more particularly to Fig. 7, A' denotes the large storage plant and $a$ the elevated tracks, one of which is adjacent to and is used to supply the large storage plant and the other to supply the car dumper B'. The storage plant is provided with a trolley $a'$ on the transverse track $a^2$, for the same purpose as the like designated parts are employed in the installation illustrated in Fig. 1. In the embodiment shown in Figs. 7, 8 and 9, the car dumper is shown as provided with two bins $b$ each adapted to discharge onto a conveyer belt $b'$, two such conveyer belts being shown, one for each bin (see Figs. 8 and 9). The conveyers $b'$ extend to the cantaliver frame E and are provided at their upper or discharge ends each with a forked chute $b^4$ which distributes the contents into the chutes of a storage bin E', four such bins being shown and each bin having two chutes, one for each of the longitudinal conveyers $e$, $e'$. Tripping mechanism F identical with that hereinbefore described, is provided for these conveyers (see Fig. 10) for the purpose of discharging the contents onto the appropriate conveyers $g^2$, $g^3$ carried by each of the loading bridges G and distributing the material to the dock storage pile J and the vessels I. The dock storage pile is provided with tunnels K and conveyers $k'$, $k^2$, similar to the correspondingly designated parts in the preceding embodiment of my invention, these conveyer belts conducting the material to the vessels L, as described hereinbefore.

Fig. 10 illustrates diagrammatically the manner in which the material conveyed to the bins E' is distributed to the conveyers $e$, $e'$. The parts designated E are parts of the cantaliver frame which support the conveyers $e$, $e'$. Each bin is shown as provided with a shaker $e^3$ and a directing chute $e^4$ for distributing the material onto one of the conveyers, $e$ or $e'$, and one of the tripping mechanisms is indicated generally at F.

By running the conveyers $k'$, $k^2$ in the reverse direction, the material thereon may be discharged onto conveyers $k^9$ and thence, through the bin $k^{10}$ onto the conveyers $b'$. A conveyer $k^{11}$ serves to carry coal from the storage plant A' to the conveyer $k^{12}$ and thence, through the bin $k^{10}$, to the conveyers $b'$. A conveyer $k^{13}$ is adapted to receive coal from a lateral chute of the car dumper B' and discharge the same onto a conveyer $k^{14}$, whence it is carried to the storage plant A' by the belt $k^{11}$, when operating in the reverse direction. Another conveyer $k^{15}$, under the dumping trestle $a$ adjacent to the storage plant A', conducts coal to the conveyer $k^{12}$ and thence to the conveyers $b'$ through the bin $k^{10}$.

In connection with either of the systems disclosed herein, I may employ a somewhat different type of pivoted conveyer carrier and a somewhat different type of coöperating ram or frame. In Fig. 11, the bridge G' is shown as provided at its upper inclined end with a pivoted belt-carrying frame which comprises two jointed or articulated members $g^{16}$ and $g^{17}$, the joints between these members being supported by a tackle P the fall $p$ whereof may be led over pulleys $p'$, $p^2$ on the upper end of the bridge and on the tower H', the end of the fall being connected to a counterweight $p^3$. The lower end of the member $g^{17}$ is pivotally connected to the ram or frame carriage $p^4$ in such manner as to slide vertically with it in the tower. The ram or frame $h^6$, like the ram or frame $h$, is vertically and longitudinally adjustable and is provided with a conveyer $h^7$. The lower end of the belt or conveyer on the member $g^{17}$ is arranged to discharge into a chute $h^8$ and thence onto the conveyer $h^7$. As the ram or frame rises and falls, this movement is automatically compensated for in the members $g^{16}$, $g^{17}$ by means of the tackle P and counterweight $p^3$.

In Fig. 12, there is shown a still further modification of the connection between the conveyer frame and the ram. In this view, G² denotes the upper end of the dock conveying bridge and H² is the tower. The lower end of the pivoted belt-carrying frame $g^{18}$ rests upon a truck $g^{19}$ which is movable on tracks $h^9$ on the ram or frame $h^{10}$. The conveyer $g^{20}$ extends over a pulley $g^{21}$, substantially at the point of pivotal connection between the frame $g^{18}$ and the bridge G², over a dumping pulley $g^{22}$ at the discharge end of the ram $h^{10}$, thence back over a pulley $g^{23}$ at the opposite end of the ram, thence around a pulley $g^{24}$ at the lower end of the frame $g^{18}$ and thence over a smaller pulley $g^{25}$ beneath the pulley $g^{21}$. By this arrangement, a single conveyer $g^{20}$ suffices to carry the material along the dock loading bridge G² and to the discharge end of the ram or frame $h^{10}$, whence it may be distributed through the swinging chute $h^4$. The ram or frame $h^{10}$, like those in the preceding modifications, is vertically and longitudinally adjustable, the rollers which support it in its longitudinal movement being indicated at $h^{11}$.

Having thus described my invention, what I claim is:—

1. In a loading and unloading plant, the combination of a plurality of laterally movable bridges, a frame overhanging one end of each of said bridges, a plurality of conveyers supported by the frame, one for each bridge, and extending at substantially right angles to the length of said bridges, a pair of conveyers carried by each bridge, tripping mechanism adjustably carried by said frame, for each conveyer thereof, and an adjustable distributer on each bridge for discharging the material received from the appropriate tripping mechanism onto one or both bridge conveyers.

2. In a loading and unloading plant, the combination, with a series of conveyers, of a tripper arranged in connection with each conveyer and movable longitudinally thereof, a second series of conveyers arranged at an angle to said first conveyers and movable with reference thereto, and means carried by each of said second conveyers for shifting its respective tripper and directing material from the first conveyer to the second conveyer.

3. In a loading and unloading plant, the combination of a series of conveyers, a traveling bridge extending transversely of said conveyers and movable in the direction of said conveyers, a conveyer on said bridge, tripping mechanism associated with each of the first mentioned conveyers and adjustable longitudinally thereof, and means adjustable along said bridge and transversely of the conveyers in said series for distributing the material from any of the trippers onto the bridge conveyer.

4. The combination, with a frame work, of conveyers running parallel with a dock, a series of dock loading bridges, each bridge being provided with two conveyers, one for discharging its load to a vehicle and the other for discharging its load onto a dock storage, a tripper associated with each conveyer and with each bridge, and a distributer arranged also in connection with each tripper and bridge whereby the load is distributed to the proper conveyer or conveyers.

5. In a loading and unloading plant, the combination of a series of conveyers, a tripper associated with each conveyer and movable longitudinally thereof, a traveling bridge extending transversely of said conveyers and movable in the direction thereof, a pair of conveyers on said bridge, and a distributing device movable longitudinally of said bridge beneath the first mentioned conveyers and adapted to receive the material from any of the said trippers and to distribute it upon either of the bridge conveyers.

6. In a loading and unloading plant, the combination of a series of conveyers, a traveling bridge extending transversely of said conveyers and movable in the direction thereof, a pair of conveyers on said bridge, a distributing device movable longitudinally of said bridge beneath the first mentioned conveyers and adapted to receive the material from any one of the same and to distribute it upon either of the bridge conveyers, and means for discharging material from the said series of conveyers into said device.

7. In a device of the character described, the combination, with a conveyer and a tripper longitudinally adjustable thereof, of a plurality of conveyers extending in substantially the same direction away from the first named conveyer, and a car movable above and with the last named conveyers, said car having chutes whereby material received from the tripper can be directed to one or both of the conveyers therebeneath.

8. In a device of the character described, the combination, with a conveyer and a tripper longitudinally adjustable thereof, of a plurality of conveyers extending away from the first named conveyer and in the same general direction, and a car arranged above the second conveyers and movable over all of said conveyers, said car having a plurality of chutes having their discharge ends spaced laterally and each located above one of the second conveyers.

9. In a device of the character described, the combination with a series of conveyers each having a tripper longitudinally adjustable thereof, a series of second conveyers extending away from the first named conveyers, a distributer arranged in connection with each of such second conveyers, and coöperative means between each distributer and its respective tripper.

10. In a device of the character described, the combination, with a series of conveyers, each having a discharging means longitudinally adjustable thereof, of a series of second conveyers extending away from said first conveyers each second conveyer having means for receiving material, said means being longitudinally adjustable along said second conveyers, and coöperative means between said discharging means on each of the first conveyers and the receiving means on each of the second conveyers.

11. In an apparatus of the character set forth, the combination of a series of substantially parallel conveyers and a tripper arranged in connection with each conveyer, a conveyer extending transversely of said series, and means longitudinally adjustable with respect to the transverse conveyer for delivering the contents of any conveyer of said series onto the transverse conveyer.

12. In an apparatus of the character set forth, the combination of a plurality of substantially parallel conveyers, a traveling bridge extending transversely of said conveyers and movable in the direction of said conveyers, a conveyer on said bridge, and tripping mechanism movable with said bridge for discharging the material on any of the first mentioned conveyers onto the bridge conveyer and a receiver and distributer arranged in connection with said bridge conveyer whereby said material is transferred to the bridge conveyer.

13. In an apparatus of the character set forth, the combination of a plurality of substantially parallel conveyers, a traveling bridge extending transversely with respect to said conveyers and movable in the direction of said conveyers, a pair of conveyers on said bridge, tripping mechanism associated with each of the first mentioned conveyers and movable in the direction thereof, and means carried by the bridge and adapted to engage the tripping mechanism on any of the first mentioned conveyers and discharge the contents of such conveyer onto either or both of the bridge conveyers.

14. In an apparatus of the character set forth, the combination of a plurality of substantially parallel conveyers, a traveling bridge extending transversely with respect to said conveyers and movable in the direction of said conveyers, a conveyer on said bridge, tripping mechanism associated with each of the first mentioned conveyers and movable in the direction thereof, and means carried by the bridge and adapted to engage the tripping mechanism on any of the first mentioned conveyers and discharge the contents of such conveyer onto the bridge conveyer.

15. In an apparatus of the character set forth, the combination of a series of conveyers, tripping mechanism for each of said conveyers and movable in the direction thereof, a series of bridges extending transversely of said conveyers, a pair of conveyers on each bridge, and means adjustable along said bridge for engaging the tripping mechanism of any of the first mentioned conveyers and adapted to discharge the contents of such conveyer onto either or both of the bridge conveyers.

16. In an apparatus of the character set forth, the combination of a series of conveyers, tripping mechanism for each of said conveyers and movable in the direction thereof, a series of bridges extending transversely of said conveyers, a conveyer on each bridge, and means adjustable along each of said bridges for engaging the tripping mechanism of any of the first mentioned conveyers and adapted to discharge the contents of such conveyer onto the bridge conveyer.

17. In an apparatus of the character set forth, the combination of a plurality of substantially parallel conveyers, tripping mechanism for each of said conveyers and movable in the direction thereof, a bridge extending transversely with respect to said conveyers and movable in the direction thereof, a pair of conveyers on said bridge, a car movable along the bridge, a pair of longitudinally spaced chutes on said car adapted to discharge onto the bridge conveyers, and interengaging means whereby said car is adapted to engage any one of the said tripping mechanisms.

18. In an apparatus of the character set forth, the combination of a plurality of substantially parallel conveyers, tripping mechanism for each of said conveyers movable in the direction thereof, a bridge extending transversely with respect to said conveyers and movable in the direction thereof, a pair of conveyers on said bridge, means longitudinally adjustable on the bridge for engaging any of the said tripping mechanisms, and means on said bridge for discharging the contents of such tripping mechanism upon either or both of the bridge conveyers.

19. In an apparatus of the character set forth, the combination of a plurality of substantially parallel conveyers, tripping mechanism for each of said conveyers movable in the direction thereof, a bridge extending transversely with respect to said conveyers and movable in the direction thereof, a conveyer on said bridge, means longitudinally adjustable on the bridge for engaging any of the said tripping mechanisms, and means on said bridge for discharging the contents of such tripping mechanism upon the bridge conveyer.

20. In an apparatus of the character set forth, the combination of a series of substantially parallel conveyers, tripping mechanism coöperating with each of said conveyers, a bridge extending beneath the said conveyers, a conveyer carried by the bridge, and a chute movably supported by the bridge and adapted to be brought into operative relation with any one of the tripping mechanisms and to discharge the contents of any of the first mentioned conveyers onto the bridge conveyer.

21. In an apparatus of the character set forth, the combination of a framework, a series of conveyers supported thereby, a tripper through which each conveyer passes, each tripper being supported by the frame and movable longitudinally with respect to its conveyer, a conveyer supporting bridge extending transversely of the said conveyers and having one or more conveyers thereon and movable in the direction of the first-mentioned conveyers, a distributer carrier adjustably mounted on the bridge and adapted to be brought beneath the trippers, a distributing device in said carrier, and a yoke depending from each tripper and having forks between which said distributer carrier may be introduced.

22. In a loading and unloading plant, the combination of a plurality of laterally movable bridges, a frame overhanging one end of each of said bridges, a plurality of conveyers supported by the frame and extending at substantially right angles to said bridges, a conveyer carried by each bridge, tripping mechanism adjustably carried by said frame, for each conveyer thereof, and an adjustable distributer on each bridge for discharging the material received from the appropriate tripping mechanism onto the bridge conveyer.

23. In a loading and unloading plant, the combination of a series of conveyers, a traveling bridge extending transversely with respect to said conveyers and movable in the direction thereof, a conveyer on said bridge, a distributing device movable longitudinally with respect to said bridge beneath the first mentioned conveyers and adapted to receive the material from any one of the same and to distribute it upon the bridge conveyer, and means for discharging material from the said series of conveyers into the distributing device.

24. The combination, with a series of conveyers, of a tripping device associated with each conveyer of said series, a bridge extending transversely of the series of conveyers and movable longitudinally thereof, a conveyer on said bridge, and a car or truck longitudinally movable along the bridge, said car or truck having a chute adapted to receive material from any one of the conveyers of the series and discharge the same upon the bridge conveyer.

25. In an apparatus of the character described, the combination, with car dumping means, of a pivoted conveyer adapted to receive material from such car dumping means, a series of bins into which said pivoted conveyer is adapted to discharge, a tower, a vertically and longitudinally adjustable conveyer on said tower, and means for conveying material from said bins to the conveyer on said tower.

26. The combination, with a pivoted conveyer and means for discharging material thereonto, of a series of bins coöperating with said conveyer, a movable tower, a vertically and longitudinally adjustable conveyer belt on said tower, and conveyer mechanism extending between a bin of said series and the conveyer on said tower.

27. In an apparatus of the character described, the combination, with a series of bins and means for supplying material thereto, of a movable tower, a conveyer vertically and longitudinally adjustable in said tower, conveying mechanism for conducting material from a bin of said series to the conveyer on said tower, and a conveyer coöperating with another bin of said series for conducting material therefrom.

28. In an apparatus of the character described, the combination, with a series of bins and means for discharging material thereinto, of a movable tower, a conveyer vertically and longitudinally adjustable in said tower, a conveyer adapted and arranged to conduct material from one of said bins to the last mentioned conveyer, a pivoted conveyer, and means for supplying material from one of the bins of said series to the last-mentioned conveyer.

29. In an apparatus of the character described, the combination, with a series of bins, of a conveyer pivoted at one end and adapted to discharge into the bins of said series, means for supplying material to said conveyer, a movable tower, a vertically and longitudinally adjustable conveyer on said tower, a conveyer for conducting material from a bin of the series to the conveyer in said tower, a pivoted conveyer, and means for supplying material thereto from one of the bins of said series.

30. The combination, with a movable tower, of a vertically and longitudinally adjustable conveyer arranged in said tower, an inclined bridge having its upper end supported by said tower, a carrier frame pivoted to said bridge and having its swinging end supported by said tower, and a conveyer carried by said bridge and said carrier frame and adapted to discharge upon the conveyer in said tower.

31. The combination, with a movable tower, of a conveyer frame vertically and longitudinally adjustable within said tower, a conveyer carried by said frame, a bridge connected to and movable with said tower, and a conveyer carried by said bridge and having a swinging section adapted to discharge upon the first mentioned conveyer.

In testimony whereof, I hereunto affix my signature in the presence of two witnesses.

JAS. W. FRAZIER.

Witnesses:
J. B. HULL,
BRENNAN B. WEST.